June 29, 1937.  G. JOHNSTON  2,085,024
MACHINE GUN MOUNT
Filed Jan. 5, 1933    11 Sheets-Sheet 5
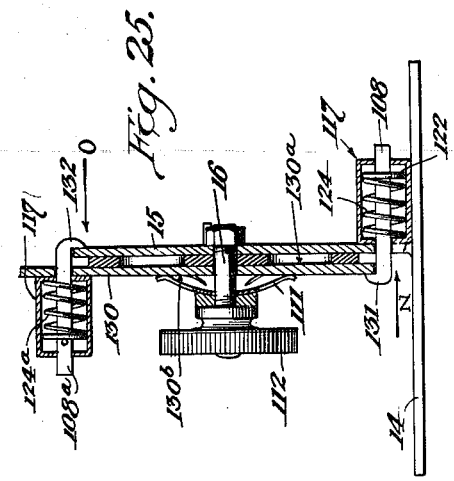
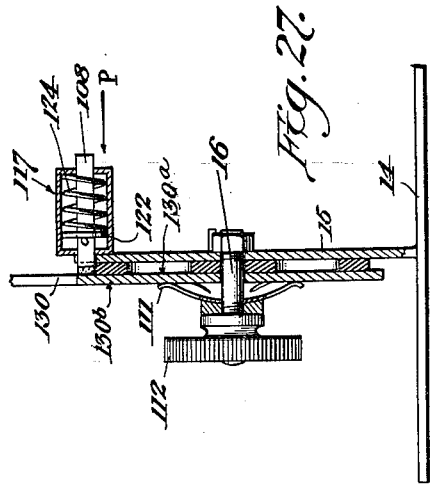
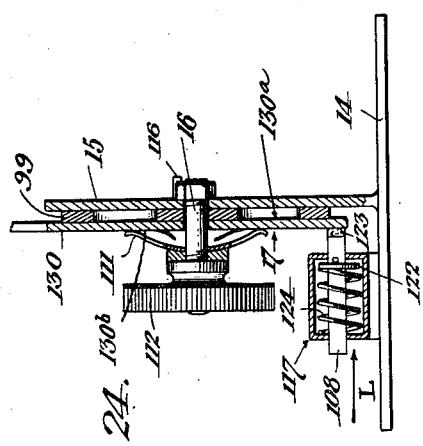
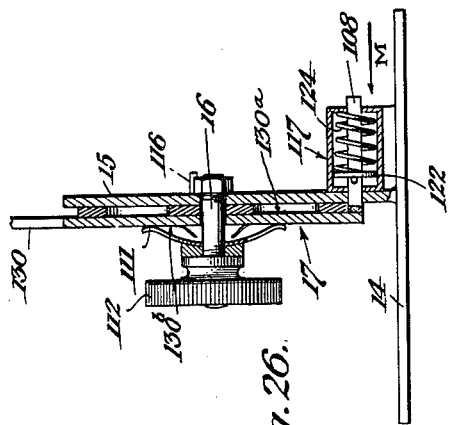
Inventor,
Greenhow Johnston.
By Ivan P. Tashof,
Attorney

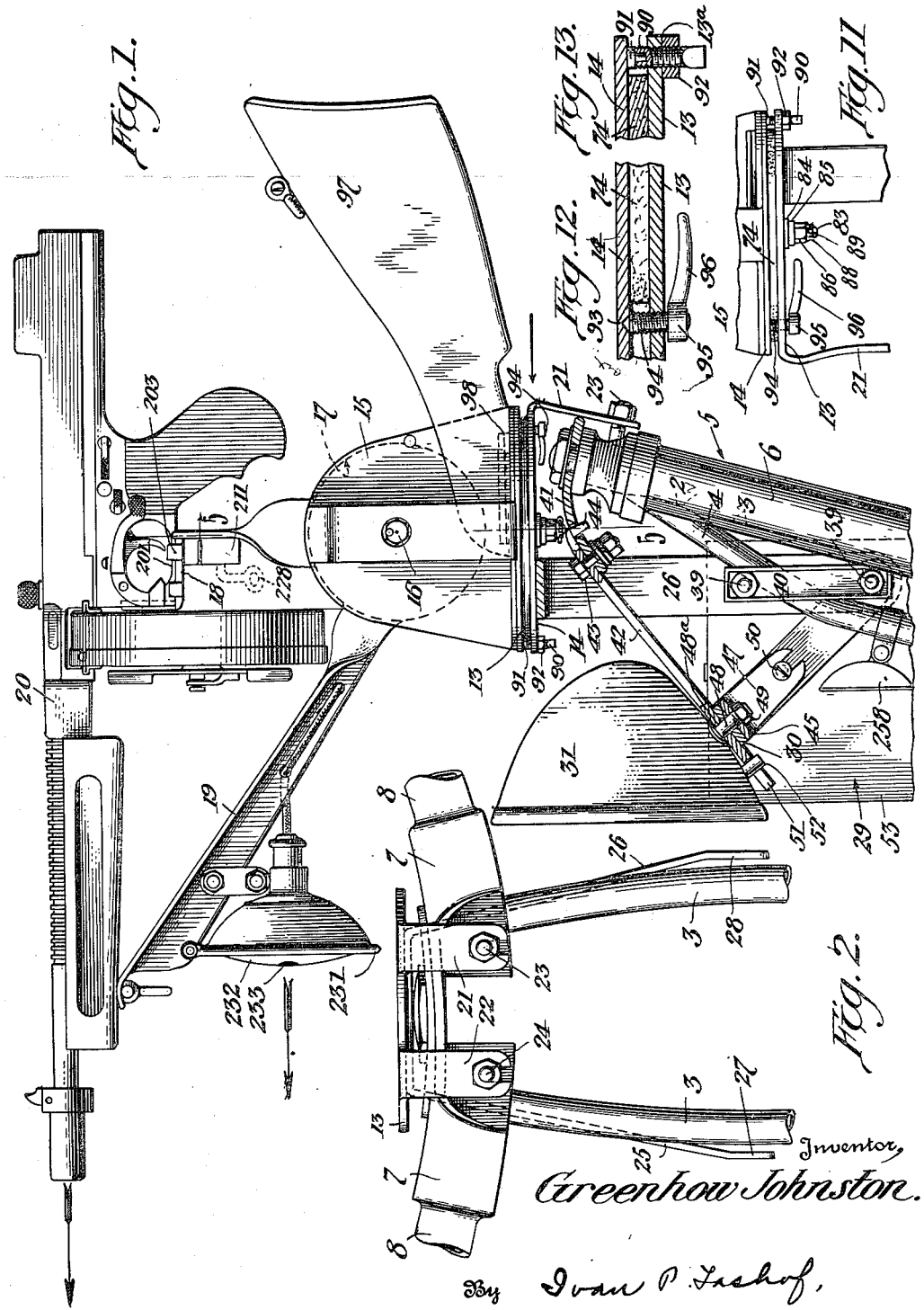

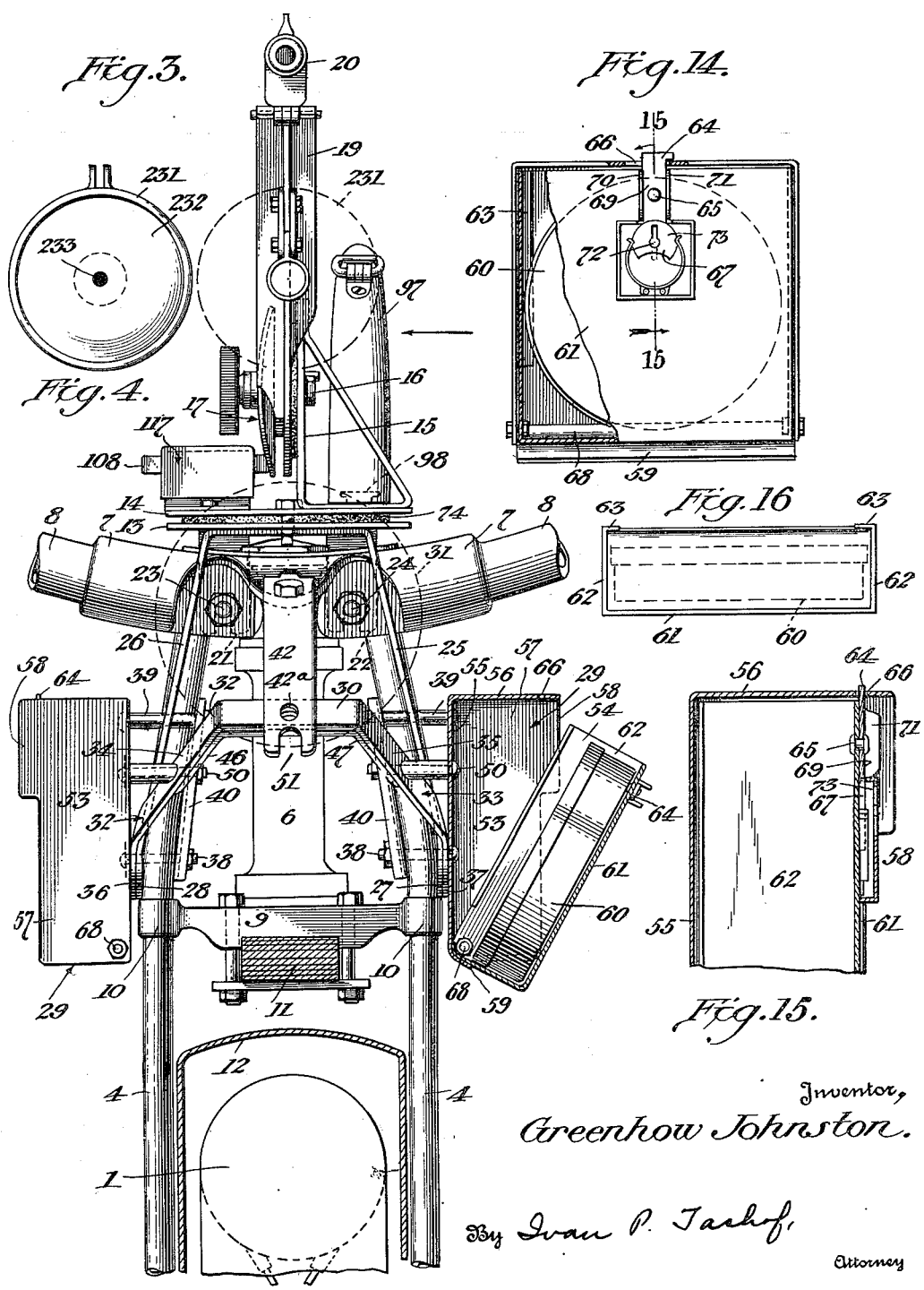

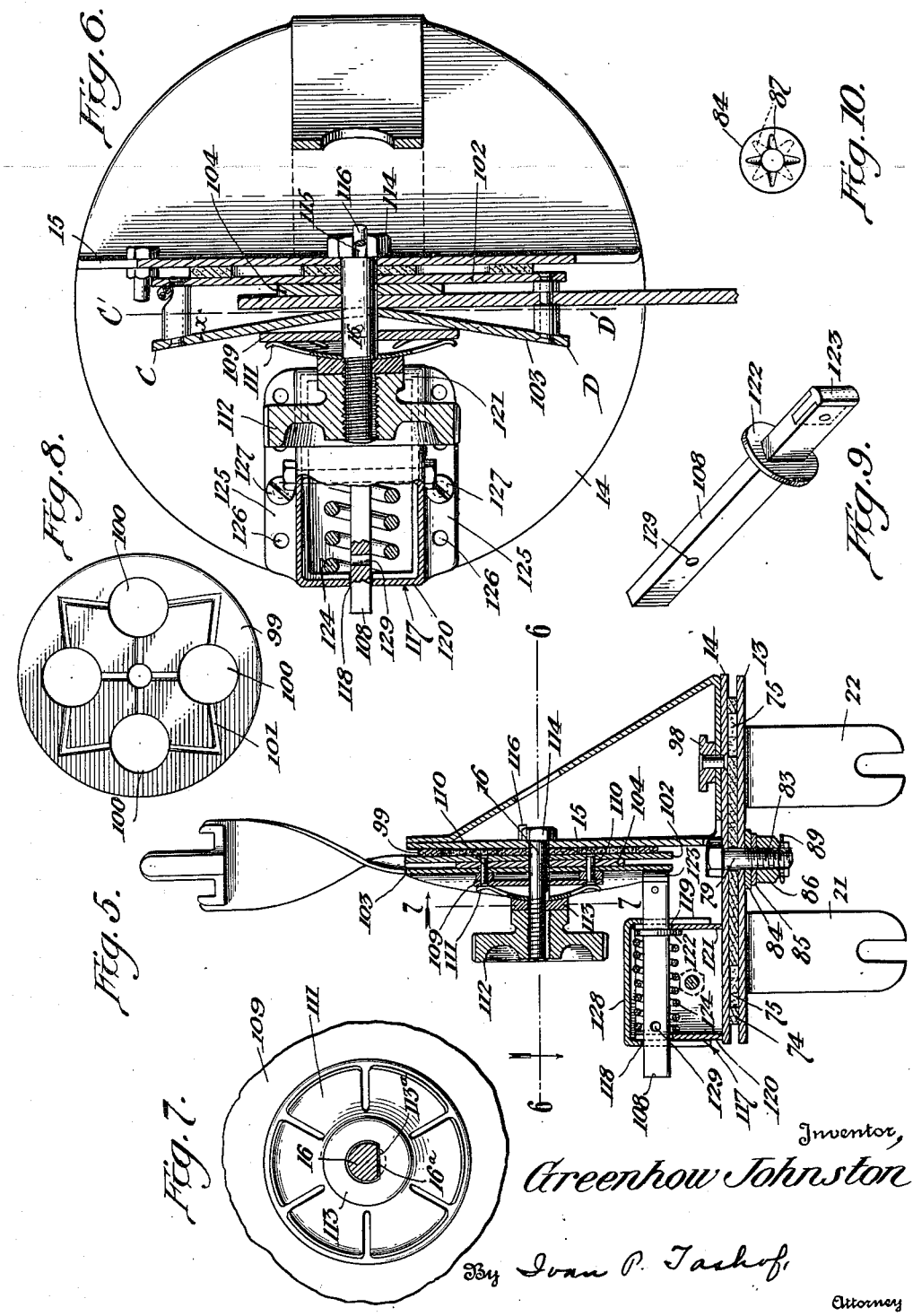

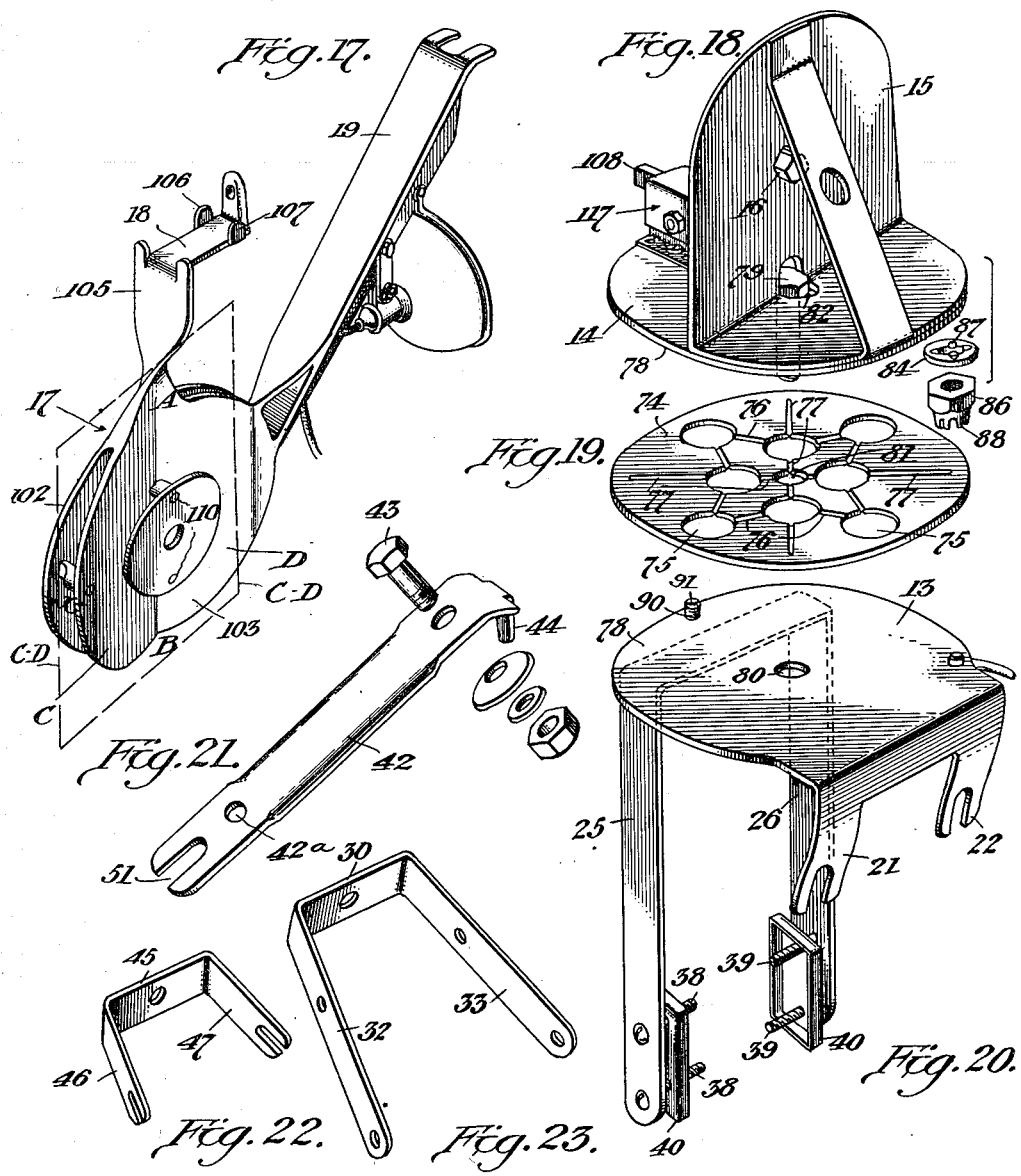

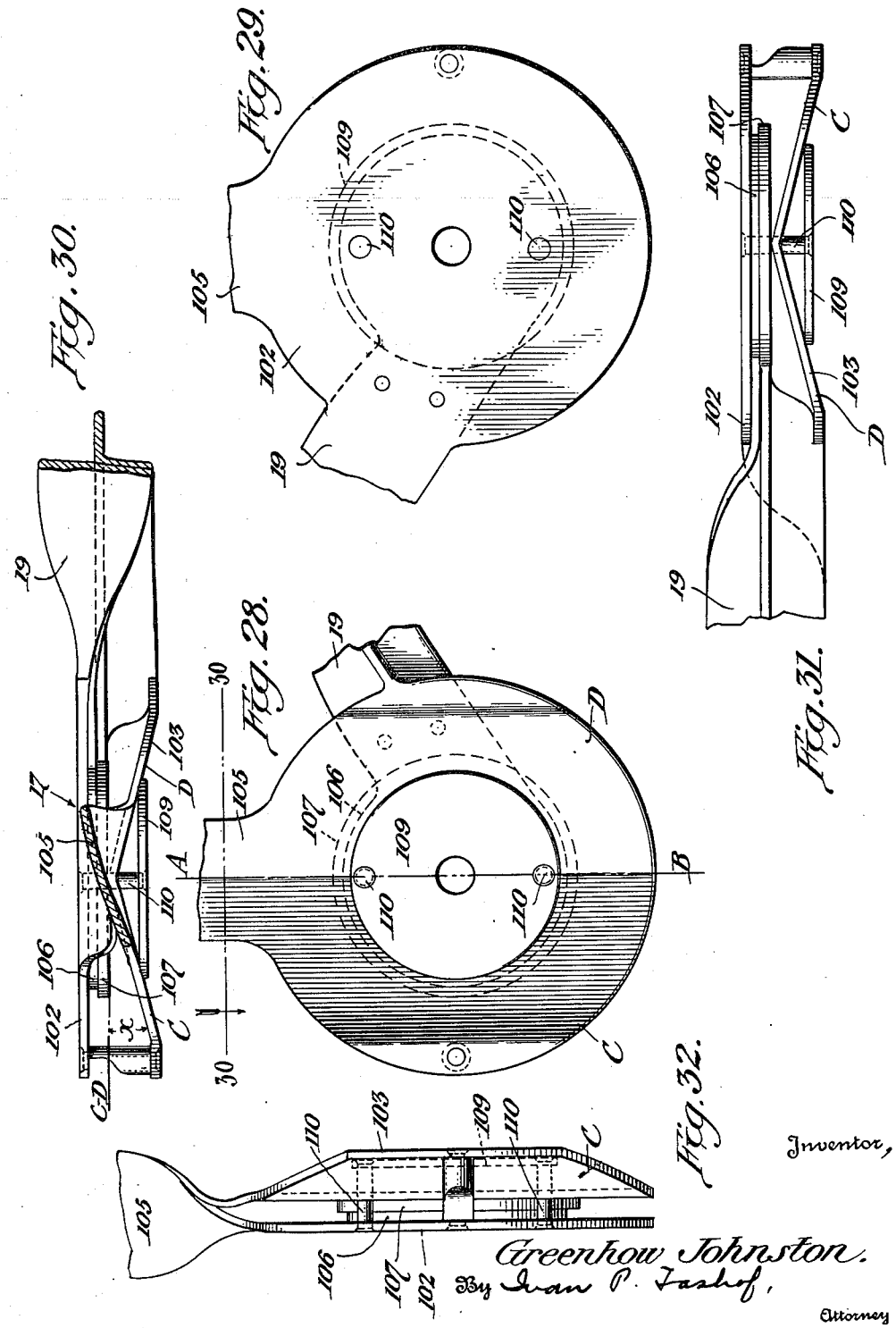
June 29, 1937.  G. JOHNSTON  2,085,024
MACHINE GUN MOUNT
Filed Jan. 5, 1933  11 Sheets-Sheet 6

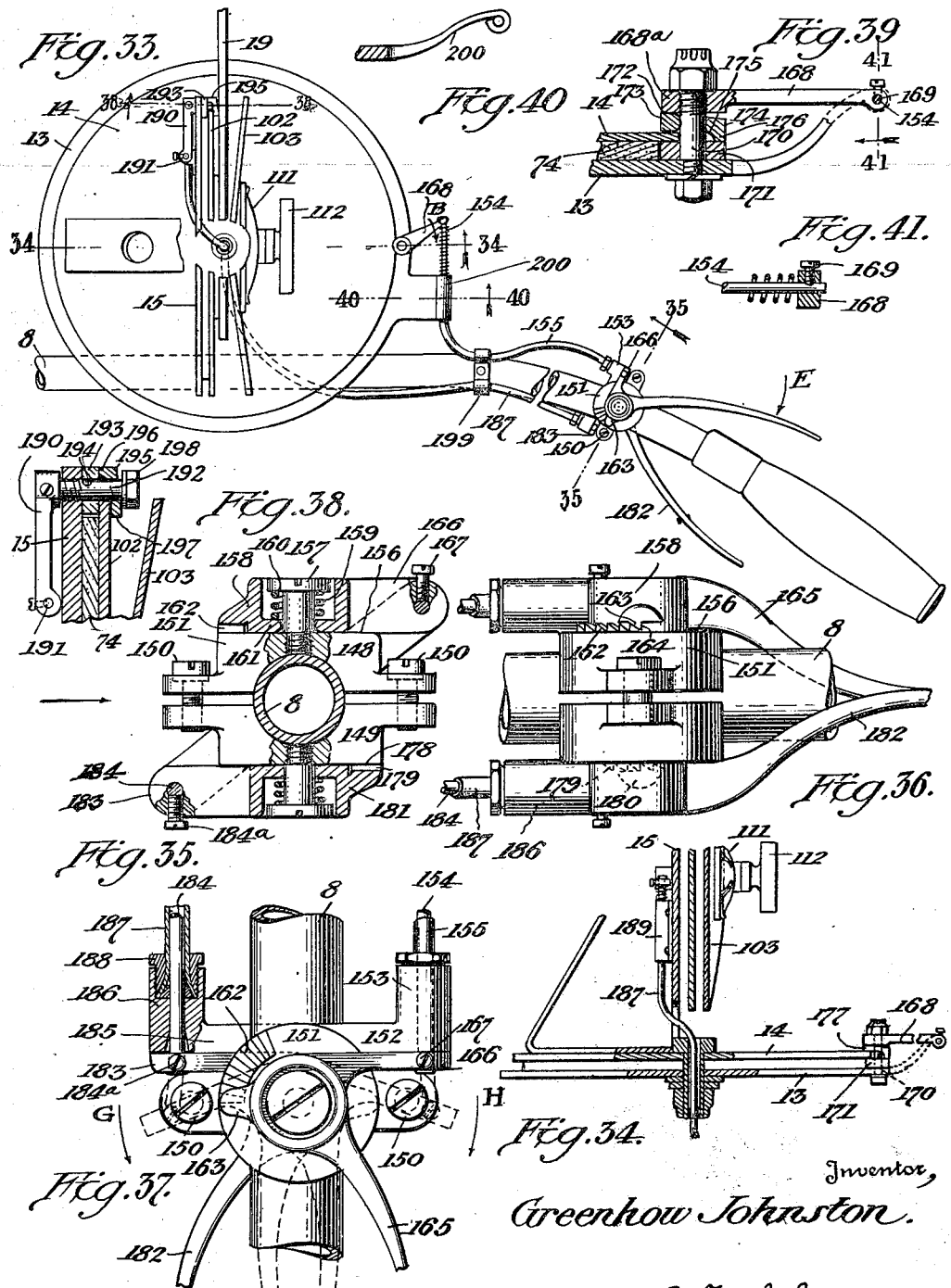

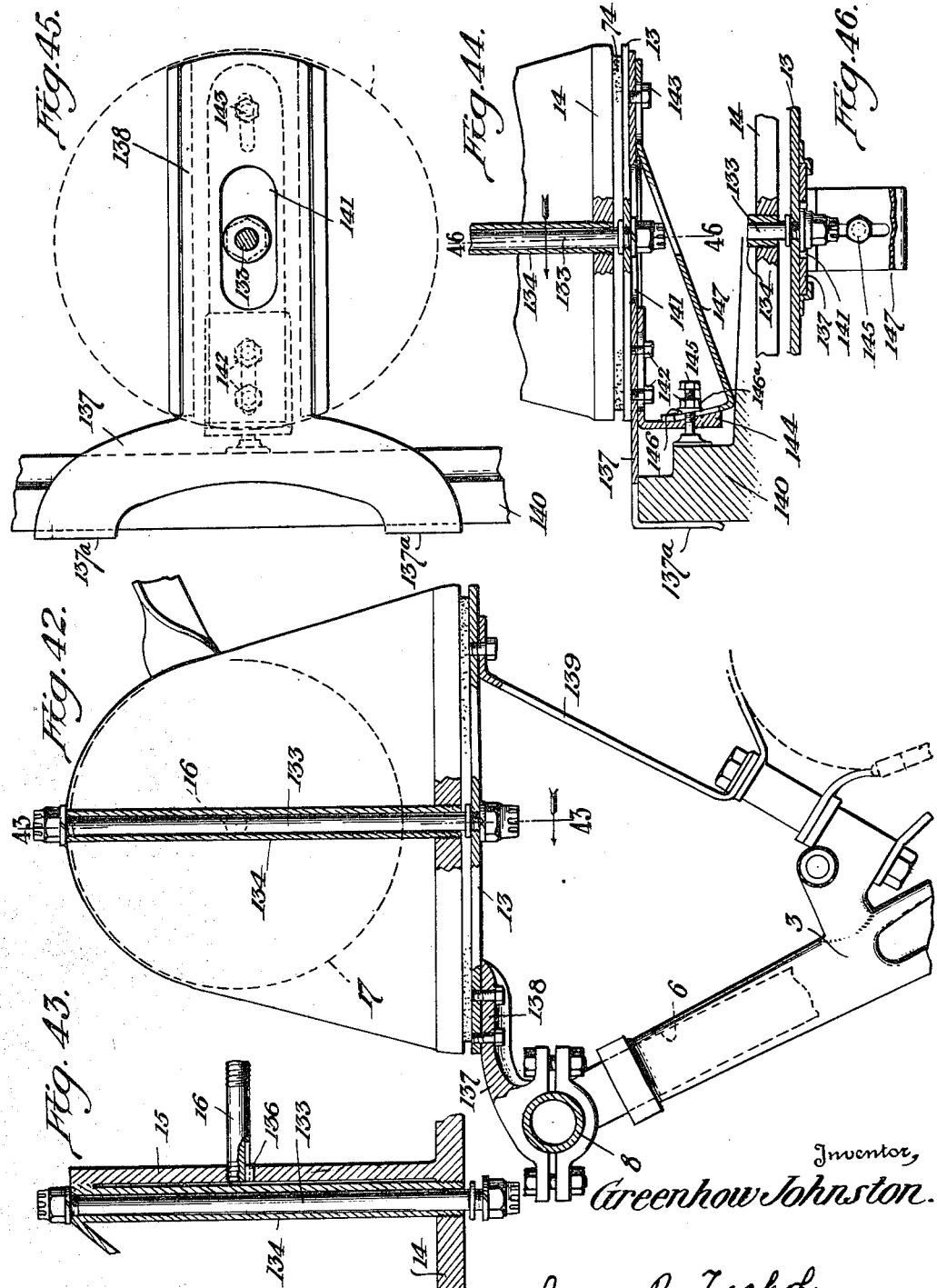

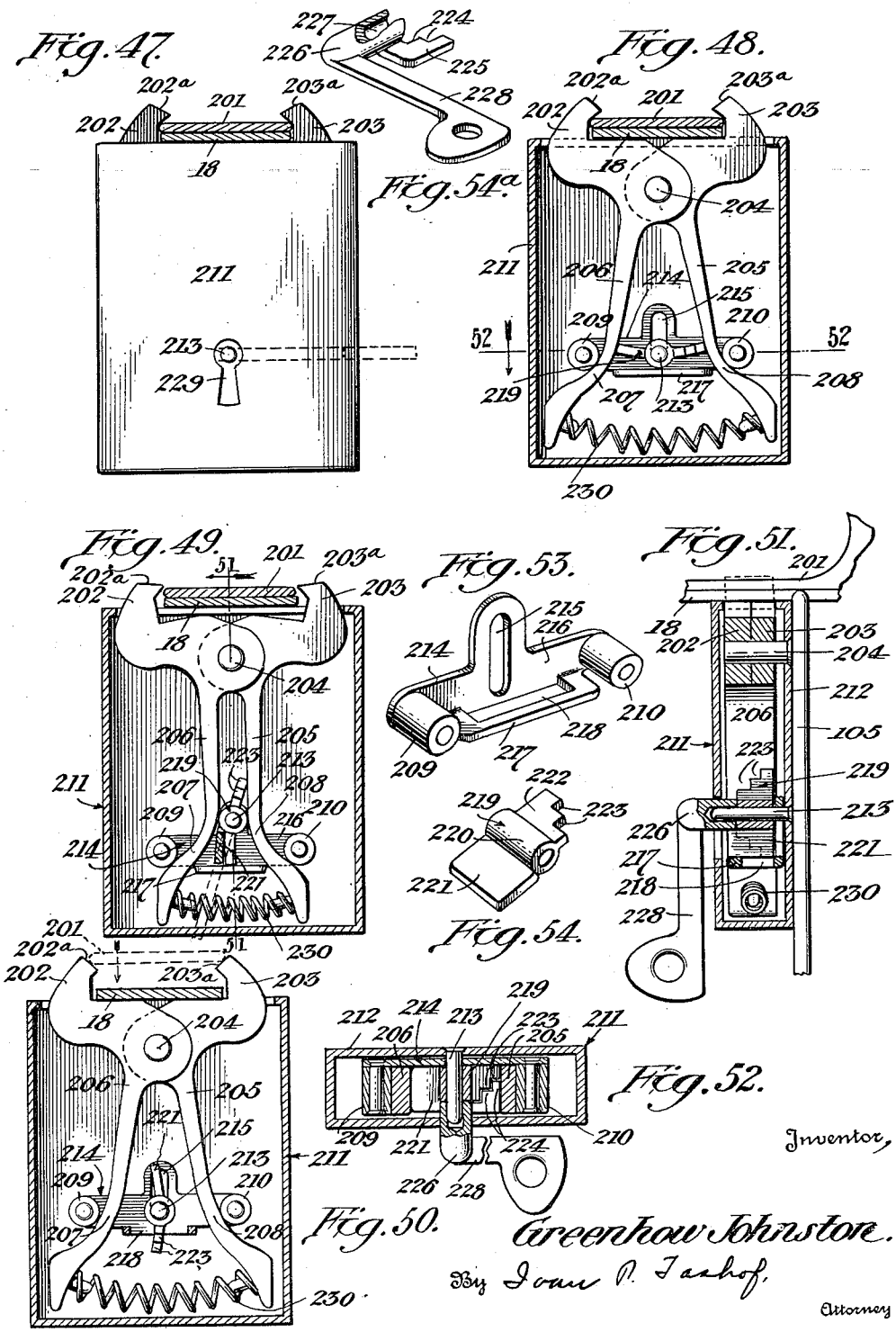

June 29, 1937.  G. JOHNSTON  2,085,024
MACHINE GUN MOUNT
Filed Jan. 5, 1933   11 Sheets-Sheet 10

Inventor,
Greenhow Johnston.
By Ivan P. Tashof
Attorney

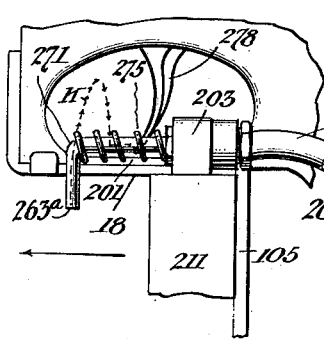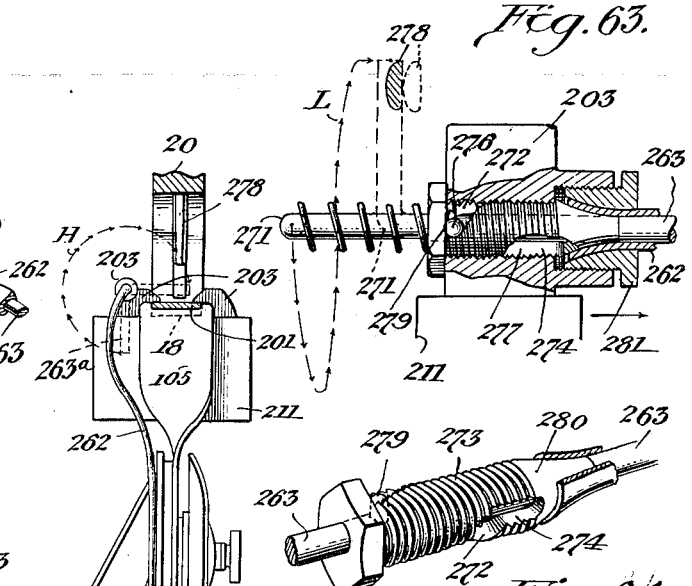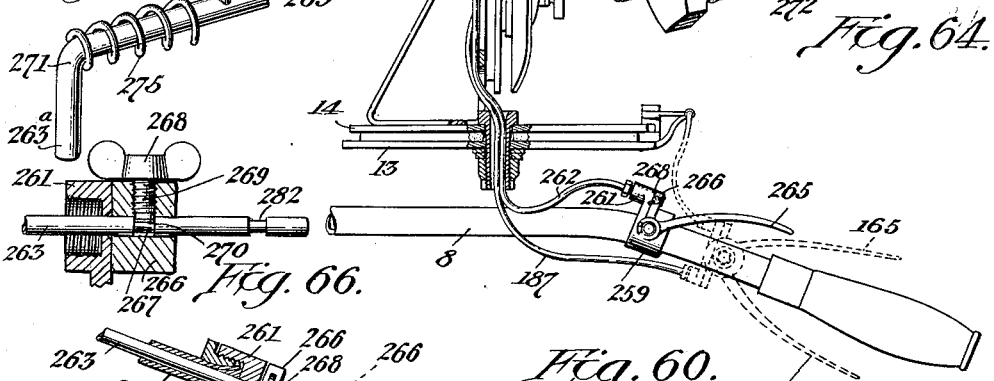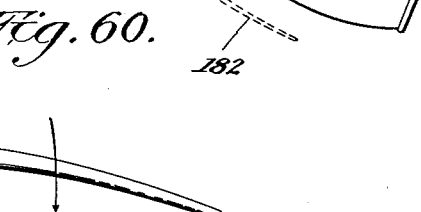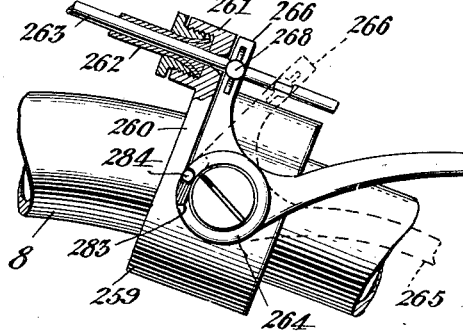

Patented June 29, 1937

2,085,024

UNITED STATES PATENT OFFICE 2,085,024

MACHINE GUN MOUNT

Greenhow Johnston, Glen Allen, Va., assignor of one-half to Greenhow Maury, Jr., Richmond, Va.

Application January 5, 1933, Serial No. 650,344

24 Claims. (Cl. 89—40)

The present invention relates to improvements in a mount for supporting instruments upon vehicles of various kinds. While the mount herein set forth is particularly adapted for supporting a machine gun upon a motorcycle, it is to be understood that it can be used in connection with an automobile, an aeroplane, a railway car and a boat. Further, the instrument carried by the mount may be a field telescope, a machine gun, or rifle, a motion picture camera, or the like.

One of the objects of the present invention is to provide a light, compact mount of simple construction which will at all times hold the instrument carried thereby in a rigid position. More specifically, one of the objects of the present invention is to provide the mount with an instrument carrying head of simple construction having a light weight cam plate having opposing cam segments positioned at an obtuse angle to one another, the cam plate being so shaped as to tighten itself against the braking means associated therewith as the instrument carrying head and instrument move from a predetermined set position.

More particularly, the instrument carrying head is pivotally mounted on a support and has a face provided with a pair of synclinally arranged braking surfaces. Braking means are provided for engaging said face at the junction of the synclinally arranged surfaces in the normal position of the instrument carrying head, and press against the face substantially at right angles whereby movement of the head from normal position increases the braking effect of the braking means.

Another object of the invention is to provide simple and effective means for fastening the mount to the motorcycle so that it turns with the handle bar thereof.

Another object of the invention is to provide the instrument supporting base upon which the instrument turntable is mounted with brace members which are rigidly fastened as a unit with the light supporting brace and ammunition box to the fork frame.

A still further object of the invention is to provide means for locking the instrument turntable to the instrument supporting base so that lost motion between the two can be taken care of.

Another object of the invention is to provide the motorcycle with a main lamp positioned well below the instrument supporting base.

Still a further object of the invention is to provide a signal light positioned on the projecting arm of the instrument carrying head and preferably mounted so that the horizontal central axis of the lamp is parallel to the horizontal central axis of the instrument or gun, the lamp being provided with a bull's eye and, therefore, in addition to functioning as a spot light also functions as a target or object finding medium.

Another object of the invention is to provide the motorcycle with ammunition boxes comprising stationary and movable compartments which will allow the easy removal therefrom of the magazine containing the ammunition and at the same time prevent the magazine from falling out when the motorcycle is in a normal position or inclined at an angle to the horizontal as occurs when turning curves.

A further object is to provide means operable from the handle bar of the motorcycle for braking the instrument turntable against the turntable supporting base.

Another object is to provide means operable from the handle bar for braking the instrument carrying head and its plate member in any desired position.

Still another object of the invention is to provide means for locking a gun to the gun seat.

An additional object is to provide signal light and noise control mechanism carried by the handle bar of the motorcycle.

Another object is to provide means for operating the gun trigger from a lever carried on the handle bar of the motorcycle.

Other objects and advantages of the present invention will become apparent from the following specification.

The present invention also contemplates certain novel details of combination, construction and arrangement of parts of the improved apparatus whereby certain important advantages are obtained, as will be more fully described hereinafter and pointed out in the claims, it being understood that the invention is susceptible of various changes in construction which may be made within the scope of the claims without departing from the spirit of the invention.

The present invention will be disclosed and fully explained by reference to the accompanying drawings.

Figure 1 is a side elevation showing the gun mount and means for positioning it on the motorcycle;

Fig. 2 is a back elevation looking in the direction of the arrow of Fig. 1, showing the mounting of the instrument carrying head base on the handle bar and the fork members;

Fig. 3 is a front elevation of the gun mount positioned on the motorcycle;

Fig. 4 is a front elevation of the motorcycle spot light lens;

Fig. 5 is a longitudinal vertical section taken on line 5—5 of Fig. 1;

Fig. 6 is a horizontal section on line 6—6 of Fig. 5, a portion of the plunger casing being broken away to show the spring;

Fig. 7 is a combined sectional and side elevational view, the section being taken on line 7—7 of Fig. 5;

Fig. 8 is a detail of the lubricating plate interposed between the instrument carrying head base and base standard;

Fig. 9 is a perspective of the spring actuated plunger shown in Figs. 5 and 6;

Fig. 10 is a detail of the lubrication washer carried by the main fastening bolt;

Fig. 11 is a detail of means for locking the instrument turntable to the instrument supporting base and means for taking up lost motion therebetween;

Fig. 12 is a detail of the locking means;

Fig. 13 is a detail of the means for taking up the lost motion between the instrument supporting base and the turntable;

Fig. 14 is a side elevation partially in section of the ammunition box or carrier;

Fig. 15 is a partial vertical section of the ammunition carrier taken on the line 15—15 of Fig. 14;

Fig. 16 is a plan view of the movable closure compartment of the ammunition box;

Fig. 17 is a perspective view of the instrument carrying head;

Fig. 18 is a perspective view of the instrument carrying head base or turntable;

Fig. 19 is a perspective of the self-lubricating friction disk interposed between the instrument supporting base and the instrument turntable;

Fig. 20 is a perspective view of the instrument supporting base provided with downwardly extending leg members and flange members whereby the supporting base is mounted on the motorcycle frame;

Fig. 21 is a perspective of the light bracket;

Fig. 22 is a detail of the light bracket strengthening member;

Fig. 23 is a detail of the light bracket brace;

Figure 58:
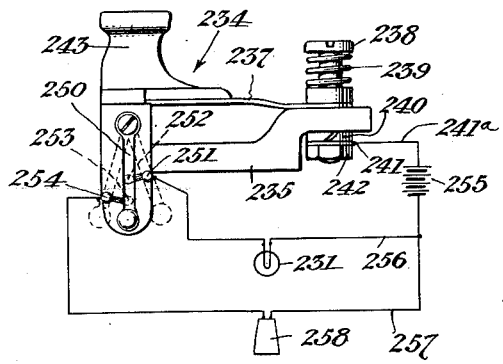
Figure 56:
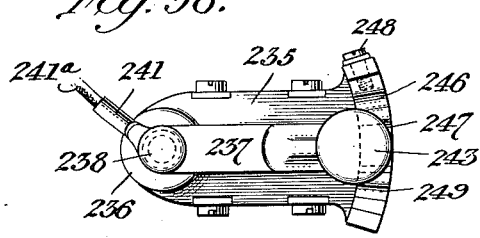
Figure 59:
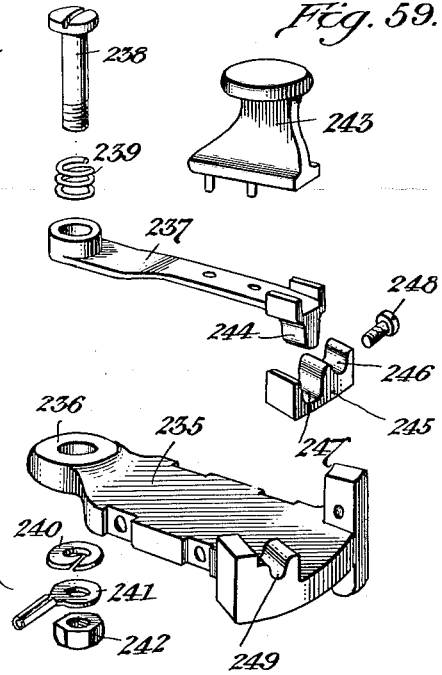
Figure 55:
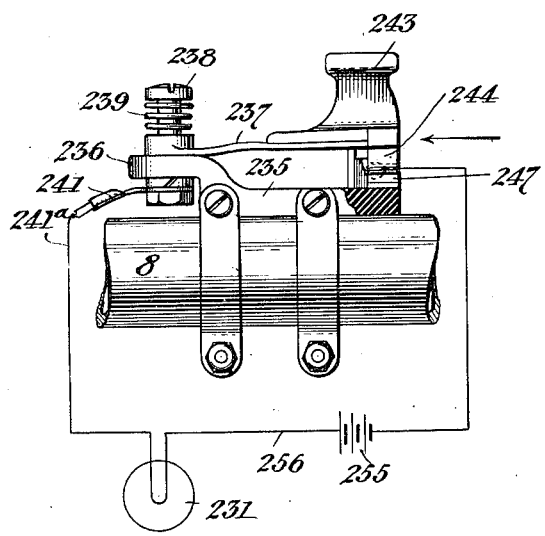
Figure 57:
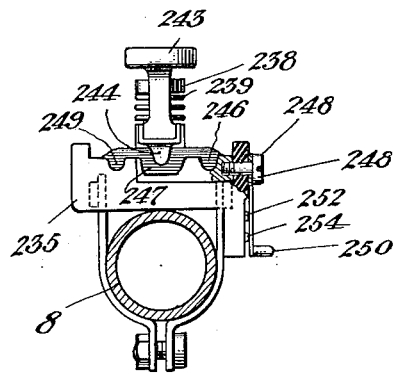

Figs. 24 to 27 inclusive are vertical sectional views showing the instrument carrying head and spring pressure means in various positions to provide frictional resistance for preventing the instrument carrying head from turning after it has been once set in a predetermined position;

Fig. 28 is a side view of the cam shaped instrument carrying head;

Fig. 29 is a side elevation of the reverse side of the cam shaped member;

Fig. 30 is a plan view partially in section of the cam shaped member, the section being taken along line 30—30 of Fig. 28;

Fig. 31 is a bottom plan view of the instrument carrying head;

Fig. 32 is a side elevation of the cam shaped member;

Fig. 33 is a plan view of means for braking the turntable to the instrument supporting base and separate means for braking the plate member of the instrument carrying head, both means being operable from the motorcycle handle bar;

Fig. 34 is a vertical section taken on line 34—34 of Fig. 33;

Fig. 35 is a vertical section taken on line 35—35 of Fig. 33, showing details of the handle bar brake operating mechanism;

Fig. 36 is a side elevation looking in the direction of the arrow of Fig. 35;

Fig. 37 is an enlarged plan view partially in section of the handle bar brake-operating mechanism;

Fig. 38 is an enlarged horizontal sectional view of the instrument-plate braking shoe and its associated elements, taken on line 38—38 of Fig. 33;

Fig. 39 is an enlarged vertical section of the mechanism for braking the turntable to its supporting base;

Fig. 40 is a transverse vertical section taken on line 40—40 of Fig. 33;

Fig. 41 is an enlarged vertical section taken on line 41—41 of Fig. 39;

Fig. 42 is a side view partially in section showing a modified form of mount adapted to be mounted on a Harley-Davison motorcycle;

Fig. 43 is a vertical section on line 43—43 of Fig. 42;

Fig. 44 shows a modified form of mounting the instrument turntable on the instrument base whereby the horizontal position of the mount may be varied;

Fig. 45 is a bottom plan view of the mounting shown in Fig. 44;

Fig. 46 is a vertical section on the line 46—46 of Fig. 44;

Fig. 47 is a front elevation partially in section of a lock for locking the instrument to the seat carried by the instrument carrying head;

Fig. 48 is a front elevation of the locking mechanism in its locked position;

Fig. 49 is a similar view showing the locking mechanism in the unlocked position;

Fig. 50 is a front elevation partly in section showing an intermediate position of the locking mechanism whereby the trigger guard base of the gun may be snapped into a holding position and thereafter locked to the instrument carrying head seat;

Fig. 51 is a vertical section on line 51—51 of Fig. 49;

Fig. 52 is a horizontal cross scetion taken on the line 52—52 of Fig. 48, the key being in a position to be turned to its unlocking position;

Fig. 53 is a detail of the roller locking member;

Fig. 54 is a perspective of the locking dog adapted to cooperate with the roller locking member;

Fig. 54a is a detail of a locking key;

Fig. 55 is a side elevation of the signal and noise control mechanism carried by the handle bar of the motorcycle;

Fig. 56 is a plan view thereof;

Fig. 57 is an end view thereof partially in section taken in the direction of the arrow of Fig. 55;

Fig. 58 is a composite view of the signal light and noise mechanism showing the necessary wiring;

Fig. 59 is a perspective view of the control switch elements in their disassembled relationship;

Fig. 60 is an end elevation partially in section of the instrument carrying head having a gun positioned thereon and showing the mechanism for operating the gun trigger from a lever positioned on the handle bar of the motorcycle;

Fig. 61 is a side elevation showing the gun trigger, the guard therefor, the gun locking member, the trigger cable and the coil spring adapted to retract the trigger cable to rest position;
Fig. 62 is a perspective view of the trigger cable and its cooperating coil spring;
Fig. 63 is a horizontal sectional view of the cable plug mounted in the gun locking member;
Fig. 64 is a perspective view of the cable plug;
Fig. 65 is a plan view partly in section of the trigger operating lever connected in operative relationship to the trigger cable;
Fig. 66 is a sectional detail of means for mounting the trigger cable in a safety position.

The motorcycle shown in the drawings is of the customary type, and has a front steering wheel 1 mounted in a front fork frame 2, having fork legs 3 and fork brace legs 4, said fork frame being pivotally connected to the motorcycle body in a substantially vertical axis as is customary. Mounted in the steering post frame 5 is a steering post 6 to which is attached the handle bar head 7 having a handle bar 8. The fork legs 3 are connected to the handle bar head 7 and turned therewith. The steering post 6 is fastened to the cross bar 9 which is in turn connected to the fork leg braces 4 at the points 10, and also to the fork legs 3. The motorcycle is provided with the usual front spring 11 and mud guard 12. The instrument mount comprises an instrument supporting base 13, an instrument carrying-head base or turntable 14 upon which is mounted an instrument carrying head standard 15 carrying a transverse bearing member or axle 16 upon which is mounted an instrument carrying head 17 so that it can swing on the bearing member from an upper to a lower position. The instrument carrying-head is provided with an instrument rest or seat 18 and carries an extending supporting arm 19 which is preferably integral therewith to reduce vibration to a minimum. It may be pointed out that upon firing the gun 20 the supporting member 19 carries a substantial proportion of the recoil directly to the carrying head 17 which is constructed to effectively take up the vibration produced by the recoil.

The instrument supporting base 13 is in the form of a disk and is provided with downwardly and somewhat inwardly extending flanges 21 and 22 which are mounted on the bolts 23 and 24 of the handle bar head so that when the handle bar 8 turns, the instrument supporting base turns therewith. The instrument supporting base 13 is provided with supporting or brace members 25 and 26 which may be made of a bendable material to fit the motorcycle braces, but preferably the supporting members are initially given the correct shape, as shown in Fig. 3, as it is desirable that the supporting members 25 and 26 be rigid members. As shown in Fig. 3, the supporting braces 25 and 26 extend downwardly from the supporting base 13 and terminate in turned-in end pieces 27 and 28.

A light bracket 30 is provided upon which is mounted the main light 31. The light bracket is shown in Fig. 23 and in a fitted position in Fig. 3. The light bracket is provided with legs 32 and 33, as shown in Fig. 23, and these legs may be bent to form bent-out portions 34 and 35 terminating in turned-in end pieces 36 and 37. Here again, it is preferable to initially make the bracket 30 of a rigid material bent at the time of its manufacture to conform to the desired shape which is of course determined by the type of motorcycle to which the present invention is applied.

The supporting braces 25 and 26 are fastened to the brace legs 4 by means of bolts 38 and 39. It is to be noted that these bolts also function to fasten the ammunition box 29 to brace legs 4, the bolts 38 passing through the end pieces 27 and 28 of the supporting bracket and 36 and 37 of the light bracket.

The bolts 38 and 39 which are carried by the ammunition box are positioned rearwardly of and immediately adjacent the fork brace legs 4, pass through the flanges 25 and 26, and are secured to the compression plate 40. The bolts 50 hereinafter referred to are positioned in front of the respective fork brace legs 4, and pass through the lamp bracket flanges 46 and 47. This assemblage of elements furnishes means for rigidly fastening as a unit the respective leg members of the supporting brace, and the light bracket, and the ammunition boxes to the fork frame.

The use of a mount of the character described makes it desirable to place the main light or lamp in the position shown in Fig. 1, well below the mount. Locating the lamp or light in this position is advantageous, as for high speed riding the road is well illuminated. A motorcycle of the type illustrated is provided with a light or lamp bracket 41 rigidly mounted on the steering post 6. In order to position the lamp 31 in the position referred to, the light bracket 41 is provided with a forwardly extending member 42 which is connected to the bracket 41 by suitable means, as shown at 43 and 44. If desired, the members 41 and 42 may be made integral. The lamp bracket or support 30 has positioned adjacent thereto a strengthening member 45, provided with flanges 46 and 47. The lamp 31 has fastened thereto a threaded stud 48 which passes through the aperture 42a of extension member 42, the bracket 30 and the reinforcing member 45, a nut 49 being threaded onto the end of the bolt. To furnish additional support for the ammunition boxes 29, bolts 50 pass through the side walls thereof, the bracket portions or legs 34 and 35 respectively, and the strengthening flanges 46 and 47, as shown in Figs. 1 and 3. The forwardly extending member 42 is slotted at 51 to receive a stem 52 projecting from the lamp casing to further insure the rigidity of the lamp in its mounted position.

The ammunition box 29 comprises a stationary compartment 53 and a swingingly movable compartment 54 mounted on an axis 68 about which it swings or moves. The stationary compartment 53 has a side wall 55, top wall 56 and end walls 57, a portion of each end wall being cut away to provide guards 58. The side wall 55 has at its bottom-most portion a lip 59 projecting therefrom at an angle, the lip functioning to limit the movement of the movable or swinging compartment 54 to such a position as will enable the easy removal of the magazine 60 and at the same time prevent the magazine from falling out when the motorcycle is in a normal vertical position or inclined at an angle to the horizontal as occurs when turning curves.

The movable compartment 54 has a side wall 61 and end walls 62. Projecting from the end walls, as indicated in Fig. 16, are flanges 63 which insure the magazine 60 being carried with the movable compartment 54. When the motorcycle is going around curves, if the flanges 63 were not provided, the magazine 60 would, in some cases, lie against the side wall 55, and this is prevented by the flanges.

Fastened in wall 61 of the movable compartment 54 is a locking tongue 64 which moves about a pivot 65 and into a slot 66 whereby the swinging inner compartment may be locked to the outer stationary compartment. To prevent the locking tongue 64 from being moved out of its locked position, a supplemental lock 67 is provided.

It is to be noted that the locking tongue projects from a channel-shaped body member 69 having flanges 70 and 71. The supplemental lock becomes operative by inserting a key in the key hole 72 and turning the key to allow the plunger 73 to enter the channel member 69 and thereby prevent the channel member 69 from turning on its pivot 65.

Upon the instrument supporting base 13 there is mounted for horizontal rotative movement the instrument carrying head base or turntable 14. A self lubricating friction disk 74 is interposed therebetween and is provided with lubricating pockets 75 containing a suitable lubricating material such as medium soft grease or a mixture thereof with graphite. These pockets are interconnected by means of grooves 76 and certain of the pockets 75 are interconnected with grooves 77 which extend to points adjacent the circumferential surface of the disk. Grooves 76 and 77 insure adequate lubrication of the top surface 78 of the instrument supporting base 13 and the bottom surface of the turntable 14. It is to be noted that the lubricating pockets or reservoirs extend through the disk 74 while the grooves 76 and 77 do not. The end face of the disk is provided with similar grooves.

A fastening bolt 79 passes through the apertures 80, 81 and 82 respectively of the instrument supporting base 13, disk 74 and the turntable 14. The bolt shank 83 carries a lubricating washer 84, a bearing washer 85 and has a locking nut 86 threaded thereon. The lubricating washer 84 has on both its upper and lower faces lubricating grooves 87. The locking nut 86 is provided with teeth 88 which function to provide grooves adapted to receive a cotter pin 89 which passes through an aperture in the bolt shank 83. The above arrangement insures that after the turntable 14 has been put under the proper compression stress, the locking nut 86 will rotate with the bolt 79, thereby preventing the locking nut 84 from becoming unscrewed.

While the bolt and nut arrangement set forth provides for little vertical or lost motion between the instrument carrying base 13 and the turntable 14, usually there is a very small vertical motion, and auxiliary means are provided for eliminating the same.

Referring to Figs. 11 and 13, the instrument supporting base 13 is provided adjacent its circumferential wall with an aperture, the walls of which are threaded to receive a screw 90 provided with a friction head 91 which may be made of fiber, bakelite or similar material. In order to take up any vertical or lost motion between the supporting base 13 and the turntable 14, the threaded pin 91 is tightened against the bottom wall of the turntable and after it is tightened it is held in position by tightening the nut 92 against the bottom wall 13a of the instrument supporting base 13. It is obvious that the pin 90 may be mounted in the turntable 14 and press against the upper face of the instrument carrying base 13, and it will then function in a similar manner to eliminate lost or vertical motion.

Means are provided for locking the turntable 14 to the instrument supporting base 13 and when these two members are locked together the gun is oriented by a movement of the handle bar. When the two members referred to are interlocked, then the horizontal orientation of the gun is made by rotating the turntable on the instrument supporting base. In order to lock the turntable 14 to the supporting base 13, the latter is provided with a recess 93 adapted to receive the end of a pin 94 threadedly carried by the instrument supporting base 13. The pin 94 is provided with a head 95 having an extending handle 96. When the pin 94 is withdrawn from the recess 93 by operation of the handle 96, the turntable 14 is free to rotate with respect to the instrument carrying head 13. To lock the members together, the turntable 14 is rotated until the recess 93 is opposite the end of the pin 94. Thereafter the handle 96 is turned to allow the pin to project into the recess to tighten and lock the members together.

The turntable 14 may be rotated by using the gun stock 97, as shown in Fig. 1 of the drawings. Mounted on the turntable 14 is a male slide 98 which cooperates and locks with the female slide usually provided on the stock of the gun.

The instrument carrying head 17 is mounted on the transverse bearing member or axle 16 which is journaled in the instrument supporting standard 15.

Interposed between the instrument carrying head 17 and the standard 15 is a lubricating plate 99 shown in detail in Fig. 8, said plate being provided with lubricating pockets 100 which are interconnected with grooves 101 on both the upper and lower faces of the plate, the plate functioning similarly to friction plate 74.

As shown in Figs. 5 and 6, the instrument carrying head 17 comprises a flat disk 102 and a cam plate 103, a spacing plate 104 being interposed therebetween. Referring more particularly to Fig. 17, the instrument seat 18 provided with ears 106 and 107 projects from the arm 105, the latter as shown in the drawings being united to the plates 102 and 103. However, it is to be understood that this is merely illustrative of suitable means for fastening a gun rest to the carrying head 17, and that other fastening means may be employed.

The cam plate 103 carried by the axle 16 may be made by bending it outwardly along the vertical diametrical axis A—B so that each half C and D of the cam plate is at an angle to a vertical plane C—D passing through the axis A—B of the plate and located between the disk plate 102 and the cam plate proper. The angle X, as shown in Fig. 6, and as apparent from inspection of Fig. 17, which the cam plate 103 forms with the plane referred to, may of course vary according to the load carried but in the mount illustrated the angle is about 15°. It is, therefore, obvious that each half C and D of the cam plate when the latter is subjected to force tending to move it from set positions, tends to tighten itself against the cam pin 108 which carries a compression spring, as hereinafter described. It is of course obvious that the cam plate 103 instead of being made out of a metal plate and bent along its diametrical vertical axis may be cast so that the two halves C and D of the plate are at an angle to the vertical plane passing through the axis A—B of the plate. Various other ways of making a camming plate which will function similar to the camming plate herein disclosed will be obvious to those skilled in the art.

It will be seen from the foregoing that the cam pin 108 forms a braking means for the instrument carrying head, the braking means being normally located at the junction of two synclinally arranged surfaces formed on one face of an arcuate portion of the head and that the initial pressure may be adjusted to suit the conditions of use. It will be also seen that the pressure of the pin 108 which functions as braking means, is substantially at right angles to the face of the head and substantially parallel to the pivotal axis of the head.

Positioned adjacent the outer face of the cam plate 103 is a compression plate 109, the latter being secured by means of rivets 110 to the cam plate and its corresponding disk plate 102. The axle or bolt 16 passes through the compression plate and carries a compression spring 111 which bears against the compression plate 109. Threadedly mounted on the shank of the bolt 16 is an adjusting lock nut 112 whereby suitable pressure may be exerted against the cam plate 103. Interposed between the cam plate, compression spring 111 and the locking or compression nut 112 is a lock washer 113.

The axis or bolt 16 is provided with the usual bolt head 114 which is slotted at 115. A pin 116 projecting from the standard 15 rests in the slot and thereby prevents the bolt from turning when the locking nut 112 is tightened.

The bolt shank of the bolt 16 is cut away to provide a flat face 16a and the washer 113 also has a flat face 113a as shown in Fig. 7. This construction of the bolt shank and washer prevents the lock nut 112 from being loosened when the carrying head 17 is swung about its axis 16 from a predetermined set position.

This construction provides a second braking means wherein, after it is set for initial pressure, the braking pressure is maintained uniformly in all positions of the head.

Positioned on the turntable 14 is a cam plunger supporting member 117, provided with slots at the points 118 and 119 in the respective end walls 120 and 121, the slots acting as bearings for the cam plunger 108. The cam plunger 108 riding in the slots is provided with a bearing plate 122, and has at its forward end a shoe 123 of a material softer than the plunger material. The shoe may be made of fiber composition, raw hide, hard rubber, bakelite or the like. Encasing the cam plunger 108 is a compression spring 124, the forward end bearing against the plate 122, and the rearward end against the upper end of the wall 120.

When the carrying head 17 and its cam plate 103 is moved off center and upwardly, the spring 124 is compressed and the cam plunger moves rearwardly. The cam plate 103 in moving off-center or from a predetermined set position, tightens itself against the cam plunger. If the instrument which is carried by the carrying head is subjected to a shock such as the recoil of a gun, or that imparted to a motorcycle by passing over a rough surface, the carrying head and its cam plate will move momentarily, but when the force inducing the shock has expended itself, or is removed, the cam plate returns substantially to its original position. It is desired to point out that the use of pressure means in connection with a cam plate of the structure herein set forth has a dual function, namely it permits the cam plate to tighten itself against the cam plunger, operating under the pressure of the compression spring as the carrying head is moved from a predetermined set position, and also under the action of shocks it brings the carrying head substantially back to its predetermined set position.

The cam plunger supporting member 117 has flanges 125 provided with apertures 126, the walls of which are threaded to receive screws 127. Corresponding apertures are provided in the turntable 14. When it is necessary to put the compression spring 124 under greater pressure, as for example when the spring pressure has been adjusted for a gun of a certain weight and a heavier gun is used, the cam plunger supporting member 117 may be brought inwardly towards the cam plate 103 and fastened to the turntable 14 by inserting the fastening screws 127 into the proper turntable apertures.

The supporting member 117 is provided with a slotted cover plate 128, so that the cam plunger 108 may pass through the ends thereof. The cover plate prevents the compression spring from coming out when the cam plunger is moved and also prevents dirt from coming in contact with the mechanism.

The cam plunger 108 has an aperture 129 adapted to receive a cotter pin, so that the cam plunger can be retracted and held in its retracted position to facilitate the removal of the carrying head 17 from its supporting standard 15.

In Figures 24 to 27 inclusive, modifications are shown of a carrying head having a flat plate 130 instead of a cam plate. It is desired to point out that the cam plate hereinbefore described is the preferable form of plate to use, so as to accomplish the precise functions desired. However, under certain circumstances, a flat plate may be used. When using a flat plate, it is mounted upon the bolt or axle 16 and has positioned adjacent thereto the primary compression spring 111, together with the train of elements necessary to function the spring. The mount is also provided with a secondary compression spring 124 and its operating elements may be similar to those already described. As illustrated in Fig. 25, two secondary compression springs 124 and 124a are provided. The cam plunger 108 is provided with a hook member 131, and the cam plunger 108a is also provided with a hook member 132. It is to be noted that the compression springs 124 and 124a are positioned on opposite sides of the cam plate 130, and in this way the application of the secondary pressure may be applied as desired. As shown in Fig. 26, secondary pressure is applied to the cam plunger face 130a and the primary pressure is applied to the cam face 130b, the secondary compression spring being mounted on the turntable 14. As illustrated in Fig. 27, the secondary compression spring 124 is mounted on the upper portion of the standard 15 and pressure is applied to the face 130a of the cam plate 130. The secondary compression spring supporting member 117, as shown in Fig. 27, may be welded to the standard 15 or fastened thereto by any other suitable means. The upper supporting member 117 shown in Fig. 25 may of course also be welded to the cam plate 130 or fastened thereto by any suitable means and the lower member 117 may be fastened to the table 14.

As shown in Fig. 24, the secondary compression spring 124 exerts a force in the direction of the arrow against the lower portion of the cam plate 130, and the primary compression spring 111 exerts a pressure approximately centrally of the cam plate 130. As shown in Fig. 26, the secondary compression spring applies its pressure in the direction of the arrow M and in opposition to the forces applied by the primary compression spring.

As shown in Fig. 25, the secondary pressure component is split preferably into equal components and applied in opposite directions. The lower secondary compression member 124 exerts a pull against the lower portion of the cam plate 130 in the direction indicated by arrow N, and the upper secondary compression member exerts a pull against the upper portion of the standard 15 in the direction of the arrow O. The primary compression spring exerts its pressure approximately centrally of the cam plate 130.

As shown in Fig. 27, the secondary compression spring exerts its forces in the direction of the arrow P.

Figures 43 to 46 show a modified form of mounting the instrument turntable on the instrument base. Threadedly connected to the instrument supporting base 13 is a vertical axle or bearing member 133 which passes through the tubular sleeve or member 134 threadedly connected to the turntable 14, the tubular member being formed in the instrument supporting standard 15. It is obvious that the tubular sleeve 134 may be made separately from the supporting standard, and in that case it is preferably welded thereto. The bearing axle or journal 16 which carries the instrument carrying head 17 is journaled in the supporting standard 15 at 136. The vertical bearing member or axle 133 about which the turntable 14 rotates is provided at its respective ends with the necessary washers and nuts.

As shown in Figs. 42 and 45, the instrument supporting base 13 is fastened to the projecting arms 138 of the bracket 137, the latter being mounted on the handle bar 8 of the motorcycle. Adjacent the exterior portion of the supporting base 13 is a front supporting leg 139 which is preferably mounted on the fork legs 3 of the motorcycle, but which obviously can be mounted on other parts of the motorcycle frame.

As shown in Figs. 44 to 46 inclusive, the bracket 137 is supported on a base 140 which may be a constituent part of an automobile windshield, an automobile door, a tank, the fusilage of an aeroplane or dirigible, a locomotive engine, a railway car, or a boat. When using the mount on vehicles of the character above set forth or even on a motorcycle, the mount can be given a sliding forward and backward straight-line movement by employing the structure set forth in Figs. 44 to 46.

The bracket 137 is provided with a slot 141 in which the vertical bearing member or journal 133 carried by the supporting base 13 can move in either direction from its normal central position, this being accomplished by loosening the screws 142 and 143. After the instrument base is set in a predetermined position, the screws are tightened to hold the base in said position. The above provides means for allowing the horizontal position of the mount to be varied. As shown in Fig. 44, the bracket 137 is fastened to the base 140 by the flange 144, and the adjusting screw 145 which locks the nut 146a against the tapered washer 146. The supporting arm 147 is fastened to the bracket 137. The flange 144 and the arm 147 may be dispensed with and in that case the bracket arm 137a may be fastened to the base 140 by screws or bolts.

In Figs. 33 to 41 inclusive, there is shown auxiliary braking means. Fig. 13 shows one form of means for locking the turntable to the instrument supporting base 13. Greater facility for locking and braking the turntable to the supporting base may be provided for by operating a braking mechanism from the handle bar 8 of the motorcycle.

Mounted on the handle bar 8 are upper and lower flange couplings 148 and 149 coupled together by flange screws 150. The upper coupling 148 has projecting upwardly therefrom a base 151 provided with an arm 152 having a cable holder 153 apertured to permit the cable 154 to pass therethrough. The cable conduit 155 is fastened in the cable holder 153. Mounted on the upper face 156 of the base 151 and pivoting on the stud 157 is a handle head 158. Encasing the stud 157 is a ratchet spring 159 bearing against the under face of the stud head 160 and the upper face of the interior flange 161 of the handle head 158, the spring functioning to keep the handle head 158 in tight engagement with the upper face 156 of the base 151, except when the ratchet member functions.

A portion of the upper face 156 of the base 151 is provided with ratchet teeth 162 which cooperate with a dog 163 having a ratchet tooth 164, the dog forming a part of the handle head 158. Integral with the handle head 158 is a handle 165 and a lever arm 166. The cable 154 is provided with a groove which receives a screw 167 carried by the end of the lever arm 166 whereby the cable 154 is fastened to the lever arm.

When the handle 165 is pressed inwardly in the direction of arrow E, as shown in Fig. 33, the lever arm 166 is rocked to the position shown in dotted lines in Fig. 37, pulling the cable 154 with it, and the latter being pinned at 169 to the end of the rocker arm 168 pulls the rocker arm in the direction of the arrow F in Fig. 33. The rocker arm 168 is threaded on a stud 170 carried by the instrument supporting base 13 adjacent its exterior portion or peripheral edge. A spacing washer 171 is positioned on the stud between the instrument supporting base 13 and the turntable 14. Between the under face of the head 168a of the lever arm and the turntable 14, and mounted on the stud 170 is a brake 172. The upper face of the brake is cut away from the point 173 to its outer circumferential edge 174 to leave a clearance space so that when the rocker arm 168 functions it only brakes on the uncut other half of the circumferential face of the brake. The lower face 175 of the brake has extending downwardly therefrom for half of its circumferential distance a circumferential shoulder 176. When the rocker arm 168 is pulled in the direction of the arrow E, as shown in Fig. 33, the rocker arm head 168a presses against the shoe portion 177 of the brake and the latter in turn brakes the turntable 14.

The means for locking the turntable to the instrument supporting base set forth in Fig. 12 may, if desired, be used in combination with the braking arrangement immediately above described. However, for most purposes, it is desirable to withdraw the pin 94 from the recess 93 and to control the braking of the turntable 14 to the instrument supporting base 13 by the braking mechanism above described. It is clear that the pin and recess locking arrangement locks the turntable to the instrument supporting base at any position desired, and therefore provides, as set forth, greater facility of operation.

Means are provided for braking the carrying head 17 in any desired position. The lower flange coupling 149 is provided on its lower face 178 with ratchet teeth 179 which cooperate with the dog 180 having a ratchet tooth. The handle head 181 of the lower coupling 149 is provided with a handle 182 and a lever arm 183. The cable 184 is provided with a groove which receives a screw 184a carried by the end of the lever arm 183 whereby the cable 184 is fastened to the lever arm. The upper coupling 149 has projecting therefrom an arm 185 having a cable holder 186 to permit the cable to pass therethrough. The cable conduit 187 is fastened in the cable holder 186 by screwing down the nut 188.

The conduit 187 passes through a cable guide 189 secured to the standard 15. The cable 184 is fastened to the arm 190 at the point 191. The arm 190 is fixed on the end of pin 192 which is threadedly carried by the standard 15 and has a smooth face contact from the point 194 with the washer 193 and the disk plate 102 of the carrying head 17. Mounted on the bolt 192 is a braking shoe 195 which is made similar to the braking member 172 previously described, the braking member 195 having a shoe portion 196 and a shoulder portion 197. The bolt 192 carries a tightening nut 198.

When the handle 183 is pressed inwardly in the direction of the arrow G, as shown in Fig. 37, the lever arm 183 is rocked inwardly to the position shown in dotted lines, pulling the cable 184 with it, the latter being pinned at 191 to the end of the lever arm 190. As the lever arm is rotated it tightens the braking shoulder 197 against the disk 102.

The cable conduits 155 and 187 pass through a conduit holder 199 carried by the handle bars 8. The cable conduit 155 is also supported by the conduit holder 200 which is fastened to the instrument supporting base 13.

As shown in Figs. 47 and 54 inclusive, means are provided for locking an instrument such as a gun or the like to the instrument seat 18.

The bottom member 201 of the trigger guard of the gun rests on seat 18. Clamping jaws 202 and 203 function in their locked position to securely hold the gun to the seat rest. The clamping jaws which are pivoted on a pin 204 are provided with opening and closing cam levers 205 and 206 having cam portions 207 and 208 upon which rollers 209 and 210 ride to effect opening and closing of the clamping jaws. In the closed position, the jaws are locked by the following means: the lock-case 211 has a rear wall 212 in which the clamping jaw pin 204 and the master pin 213 are fixed. Mounted on the master pin is a lock member 214 provided with a slot 215 to allow the member 214 to move upwardly and downwardly, the limit of such movement being fixed by the relationship of the pin 213 in the slot 215. Extending from the lower portion of the side wall 216 of the lock member 214 is a flange 217 which is cut away to form with the side wall a rectangular opening 218. Mounted for rotation on the master pin 213 is a locking dog 219 having a hub 220. Projecting centrally from one side of the hub is a flange 221 rectangular in shape, and projecting centrally from the other side of the hub is a flange 222 shouldered to provide several steps 223 which correspond and fit face to face with the steps 224 of the key locking and unlocking flange 225, the latter being carried by the key hub 226 having an aperture 227, the key having the usual key arm 228.

Fig. 48 shows the gun in a locked position and the detailed position of the locking mechanism is shown in the locked position in Fig. 52. To unlock, the key is inserted in the key hole 229 and engages the master pin 213. The key on being given an anti-clockwise motion passes by the steps 223 of the dog flange 222 and on continued movement engages the dog flange 221 which in turn engages flange 217 of the roller member 214 and forces downwardly the cam rollers 209 and 210 riding on the cam portions 207 and 208 of the jaw levers 205 and 205 whereby the latter are forced into their releasing position, as shown in Fig. 49. The spring 230 connects the lower end of the clamping jaws. Fig. 51 shows the locking mechanism in its open position.

It is to be noted that the dog flanges 221 and 222 are in a substantially horizontal position, as shown in Fig. 48 when the locking member is in its locked position and the flanges engage the inner faces of the cam locking levers 206 and 205.

Fig. 49 shows the clamping jaws in their unlocked position with the rollers 209 and 210 in their lowermost position. The dog 219 is in its open position, but it is to be noted that the flange 221 of the dog engages the flange 217 of the roller member 214 and the stepped dog flange 222 is in its upper position. If the dog 219 is turned to the position shown in Fig. 48, the jaws are locked. However, if the movement of the dog 219 is continued to the position shown in Fig. 50, the rollers 209 and 210 will ride upwardly under the action of the tension forces induced by the spring 230 and the jaws will assume the position shown in Fig. 50 whereby the bottom member 201 of the trigger guard can be snapped into position where it is held for action. The jaws 202 and 203 are provided with cam faces 202a and 203a to facilitate the positioning of the bottom member 201 of the trigger guard on the seat rest 18. The gun after being positioned, as shown in Fig. 50 may be locked to the seat by turning the key so that the locking mechanism assumes the position shown in Fig. 48.

The steps 223 function to allow the key flange 224 to pass around the dog flange 222 and contact with the dog flange 221, this occurring on the opening of the locking mechanism. The steps 223 also allow the dog to rotate freely in the slot 218, as shown in Fig. 50.

The mount is provided with a light or lamp 231 fixed to the arm 19, the light being preferably positioned so that the horizontal central axis of the lamp is parallel to the horizontal central axis of the gun 20. The lamp has a lens 232 carrying at its center point a bull's-eye 233 which is in the form of a colored spot or a black spot, the bull's-eye functioning to throw a shadow against an object. The lamp 231 functions in several different ways. At night the lamp functions as a spot light and further, as it throws a shadow of the bull's-eye 233, it furnishes a target. Since the lamp axis is parallel to the gun axis, the shadow thrown on the object by the bull's-eye functions as a target and furnishes means for determining at what portion of the object aim is to be taken. In other words, if the horizontal axis of the gun is about 6 inches above the horizontal axis of the lamp, one will know that the bullet will strike about 6 inches above the target. The target further serves as an indicator. For example, by means of the target, one may definitely spot the rear tire of an automobile and then raise or lower the gun so as to hit the tire in its center, or the position of the gun may be adjusted, so that the bullet issuing therefrom may entirely clear the tire and hit a different portion of the automobile.

The lamp 231 also functions as a signal light and the signal control mechanism necessary for accomplishing the same as set forth in Figs. 55 to 59 inclusive. Positioned on the handle bar 8 is a signal instrument 234 provided with a multiple switch control. The instrument comprises a base 235 properly insulated to carry out its functions, the base having a head 236 for carrying a contact arm 237, the latter being attached to the head by means of a bolt 238, spring 239 and washer 240 and nut 242. A wire clip 241 carries the wire 241a. Mounted on the contact arm 237 is an insulated handle or key 243 and contact nose 244. The base 235 has fixed thereto by means of the screw 248 a contact block 245 having female contact recesses 246 and 247. The base 235 is also provided with an insulated recess 249. The base may be made of any suitable insulating material such as bakelite.

Carried by the screw 248 is a contact switch lever 250 which may contact with switch points 251, 252, 253 and 254, current being supplied by the battery 255 or any other suitable source of current. The lamp 231 is connected in circuit 256 and the horn is connected in circuit 257, as shown in Fig. 58.

When the key 243 is pressed down so that the contact nose 244 is in contact with the recess 246 and the switch lever 250 is in contact with switch point 251, the lamp 231 is continuously lighted. With the contact nose 244 in recess 246, the switch lever 250 may be moved over to contact with switch point 254, and the horn 253 or its equivalent, such as a siren, noise whistle, or the like, continuously sounds. With the contact nose 244 in contact, as above set forth, when the switch lever 250 is moved so as to contact with the contact points 252 and 253, both the light and horn are continuously in operation. It is to be noted that the fit of the contact nose 244 with the contact recess 246 is such that when the two are brought together it is necessary to manually remove the contact nose 244 from the recess in order to terminate the functioning of the light or horn.

The contact nose 244 may be brought in contact with the walls of recess 247 and the contact nose may be given such a movement as to read out Morse signals, Continental signals, or any other desired signals. With the contact nose 244 in contact with the walls of the recess 247, on vibration or movement of the contact nose 244, the light 231 will read out the desired signals when the switch lever 250 is on the contact point 251. When the switch lever 250 is in contact with the point 254, the horn will give the desired signals. When the switch lever 250 is in contact with the points 252 and 253, both light and horn will give the desired signals. A number of conditions may arise where it is eminently desirable to read out signals with both the light and the horn. For example, on a foggy night the light can only be seen for a very short distance, and then it is desirable to signal with the horn. At night-time on noisy streets, it may be desirable to use the light and horn in conjunction or if the noise is too confusing, the light only may be operated to give the desired signals.

In highway policing and in army work, many times squadrons of motorcycles or automobiles may be employed which are equipped with the signalling apparatus herein set forth. If the squadron members become separated those who are in the front may signal to those in the back by means of the horn and light, or those in the back may signal to those in the front. If the horn is not heard, then the light signals can be picked up, and in this manner there is formed a dual signal control.

The signal control above set forth may be used not only on motorcycles but can be used on aeroplanes, dirigibles, automobiles, tanks, boats and the like. However, it is particularly valuable when used on a motorcycle. When the contact nose 244 is in the contact recess 249, both the horn and the lights are off.

The bull's-eye 233 may be made of a colored material or a black material, and in this case it will of course give a black shadow. In place of the colored or black bull's-eye there may be substituted therefor a very powerful lens which will modify the rays of light so as to throw a very powerfully illuminated target, the target being surrounded by the ordinary light rays originating from the original lamp lens.

As shown in Figs. 60 to 66 inclusive, means are provided for controlling the firing of the gun from the handle bar 8 of the motorcycle. Mounted on the handle bar is a coupling 259 having extending therefrom an arm 260 provided at its end with a cable holder 261 for supporting the cable conduit 262 and guiding the cable 263 therethrough, the cable being fastened in the locking jaw 203, as shown in Fig. 61 and Fig. 63. The cable is carried through an apertured bolt which fastens together the supporting base 13 and the turntable 14, the latter being rotatably mounted.

Mounted on the coupling 259 is a lever bar 264 having a lever or handle 265, and a cable arm 266. The cable 263 has a circumferential slot 267 which receives a screw 268 working in the arm 266. The screw shank 269 is of such a length as to leave a clearance space 270 between its end and the circumferential surface of the slot 267 so that the cable 263 may rotate as hereinafter described.

When the hand lever 265 is pulled inwardly in the direction of the arrow in Fig. 65, arm 266 moves in a clockwise direction, carrying with it cable 263 which rotates, the cable being bent at a right angle at the point 271.

Screwed into the locking jaw 203 is a cable plug 273 apertured to allow the cable 263 to pass therethrough. The plug carries a spiralway 272 and is provided with a straight line slot 274. The cable carries a projecting male pin 276 which works in the spiralway 272. When the hand lever 265 is pulled in the direction of the arrow, as shown in Fig. 65, the cable 263 rotates and carries with it the pin 276 which rides in the spiralway 272 until it reaches the point 277 of the straight line slot 274. As the cable rotates, of course the cable arm 263a is carried with it. The course of travel of the cable arm 263a is shown by the small arrows respectively designated H, K and L in Figs. 60, 61 and 63, respectively. By the time the cable arm 263a has traveled the distance indicated by the arrows, the male pin 276 has traveled in the spiralway to the point 277. When the pin reaches this point, the cable arm 263 is opposite the trigger 278 and immediately contacts therewith, pushing it backward and thereby firing the gun. If the gun is of the automatic firing type, the lever 265 is held in the firing position. When the handle is released, the spring 275 encasing the cable retracts the cable arm and pulls male pin 276 back against the bearing shoulder 279. The cable is then in the position shown in Fig. 61.

At one end of the cable plug 273 is a tapered portion 280 which receives the conduit 262, the latter being held in place by the compression nut 281. The other end of the cable conduit 262 is fastened in a similar manner, as indicated in Fig. 65.

Means are provided for maintaining the gun in a safety position when utilizing a handle bar control for firing the gun. The cable 263 is provided with a secondary slot 282. When it is desired to keep the cable arm 263a in a safety position, the screw 268 is unfastened so as to allow the cable 263 to be moved forwardly until the slot 282 is positioned under the end of the screw shank 269. Thereafter, the screw 268 is turned so that the shank 269 engages the recess 282, but allows a clearance between its end and the circumferential surface of the slot so that the cable 263 and the cable arm 263a may rotate, if desired, although in this position freedom of rotation is not absolutely essential. However, when the screw 268 is engaged in the slot 267, freedom of rotation of the cable is necessary.

It is to be noted that the lever bar 264 is cut away to provide a shoulder 283. The coupling 259 is provided with a pin 284.

When the screw 268 is in the circumferential slot 267, the lever 265 and the lever head is in the firing position, as shown in Fig. 65. When the cable arm is moved so as to allow the screw 268 to engage the recess 282, on moving lever 265 inwardly it will be seen that the shoulder 283 contacts against the pin 284 and the distance between the pin 284 and the shoulder 283 is correlated to the distance between the recesses 267 and 282. When the screw 268 is in the recess 282, the lever 265 has been pushed inwardly so that the shoulder 283 abuts against the pin 284 and therefore cannot act to further move the cable. If the handle 265 is pushed upwardly from the position shown in dotted lines in Fig. 65, then the motion is carried upwardly and pin 276 will then rest against the face of the bearing member 279 and so again position the cable 263 in a safety position, thereby insuring a positive safety.

What I claim is:

1. In an instrument mount, the combination of an instrument supporting base, a turntable rotatably mounted thereon, an instrument carrying head adapted to have an instrument positioned thereon carried by said turntable and pivotally mounted to swing about a transverse axis, said instrument carrying head being in the shape of a flat plate, and braking means including a spring pressed plunger supported on the turntable and bearing against the plate adjacent its periphery for holding the plate in a predetermined position against the turning movement induced by the instrument.

2. In an instrument mount, the combination of an instrument supporting base, a turntable rotatably mounted thereon, an instrument carrying head adapted to have an instrument positioned thereon carried by said turntable and pivotally mounted to swing about a transverse axis, said instrument carrying head being in the shape of a flat plate, primary braking means mounted on said transverse axis, and secondary braking means including a spring pressed plunger positioned adjacent one edge of the plate, said secondary braking means holding the plate in a predetermined position against the turning movement induced by an instrument.

3. In an instrument, the combination of an instrument supporting base, a turntable rotatably mounted thereon, an instrument carrying head adapted to have an instrument positioned thereon carried by said turntable and pivotally mounted to swing about a transverse axis, said instrument carrying head having a cam plate comprising opposed flat cam segments positioned at an obtuse angle to one another, braking means for setting said cam member under a predetermined braking pressure to hold the instrument carrying head and instrument mounted thereon at a predetermined set initial position, said cam plate tightening itself against said braking means as the instrument carrying head and instrument move from a predetermined set position, and other braking means engaging said head and exerting constant braking effect thereon in all positions of the head.

4. In an instrument mount, the combination of an instrument supporting base, braking means mounted thereon to hold an instrument carrying head in a predetermined set position, an instrument carrying head spaced from the supporting base and pivotally mounted to swing about a transverse axis, said instrument carrying head having a relatively thin metal plate positioned against said braking means and bent to provide opposing flat cam segments shaped to tighten themselves against said braking means as the instrument carrying head and instrument move from a set initial position, and other braking means engaging said head and exerting constant braking effect thereon in all positions of the head.

5. In an instrument mount, a support, an instrument carrying head pivotally mounted on said support and having a face provided with a pair of synclinally arranged braking surfaces, braking means engaging said face at the junction of the synclinally arranged surfaces in the normal position of the head and pressing against the face substantially at right angles thereto whereby movement of the head from normal position increases the braking effect of said braking means, and other braking means engaging said head and exerting constant braking effect thereon in all positions of the head.

6. In an instrument mount, a support, an instrument carrying head pivotally mounted on said support and provided with an arcuate portion concentric with the pivotal axis, said arcuate portion having a side face provided with a pair of synclinally arranged braking surfaces, braking means engaging said face at the junction of the synclinally arranged surfaces in the normal position of the head and pressing against said face in a direction substantially parallel to the pivotal axis of said head, whereby movement of the head from normal position increases the effect of said braking means, and other braking means engaging said head and exerting constant braking effect thereon in all positions of the head.

7. In an instrument mount, a support, an instrument carrying head pivotally mounted on said support and having a face provided with a pair of synclinally arranged braking surfaces, braking means engaging said face at the junction of the synclinally arranged surfaces in the normal position of the head and pressing against the face substantially at right angles thereto whereby movement of the head from normal position increases the braking effect of said braking means, other braking means engaging said head and exerting constant braking effect thereon in all positions of the head, and means for independently adjusting the initial pressures of the respective braking means against said head.

8. In an instrument mount, a support, an instrument carrying head pivotally mounted on said support and provided with an arcuate portion concentric with the pivotal axis, said arcuate portion having a side face provided with a pair of synclinally arranged braking surfaces, braking means engaging said face at the junction of the synclinally arranged surfaces in the normal position of the head and pressing against said face in a direction substantially parallel to the pivotal axis of said head, whereby movement of the head from normal position increases the effect of said braking means, and other braking means engaging said head and exerting constant braking effect thereon in all positions of the head, and means for independently adjusting the initial pressures of the respective braking means against said head.

9. In an instrument mount, the combination of an instrument carrying head mounted to swing about a transverse axis, an instrument supporting arm projecting from said carrying head having an instrument seat for receiving and holding the rear portion of an instrument, and a second arm projecting from said instrument carrying head to receive and hold the front portion of the instrument and having mounted thereon a light illuminating member provided with a lens carrying a bull's-eye, the light member being positioned on its carrying arm so that its horizontal central axis is parallel to the horizontal central axis of the instrument.

10. A clamp for instrument mounts including clamping jaws provided with clamping levers having cam portions and pivotally mounted to move to an open position to receive the bottom member of the instrument, and to a closed position for engaging the instrument body member, roller members engaging the cam portions of each clamping member lever, and means for causing the cam rollers to ride upwardly on the respective cam portions of the clamping levers and to thereby engage the bottom member of the instrument.

11. In a motorcycle provided with a body portion, a front fork frame pivoted in the longitudinal axis of the body portion and having fork and brace members, a handle bar connected to said fork frame; the combination of a base mounted to turn with the handle bar and having downwardly extending opposing leg members, a light support extending forwardly and downwardly of the base to position the light below said base, a bracket connected to said light support and provided with opposing leg members, and means for rigidly fastening the several leg members as a unit to the fork frame.

12. In a motorcycle provided with a body portion, a steering post, a front fork frame pivoted in the longitudinal axis of the body portion and having fork and brace members and a handle bar connected to said fork frame; the combination of a base mounted to turn with the handle bar and having downwardly extending opposing leg members, a light support fixed on the steering post and extending forwardly and downwardly thereof to position the light well below the base, a bracket connected to said light support and provided with opposing leg members, and means for rigidly fastening as a unit the several leg members to the fork frame.

13. In a motorcycle provided with a body portion, a front fork frame positioned in the longitudinal axis of the body portion having fork and brace members, and a handle bar connected to said fork member; the combination of a base mounted to turn with the handle bar and having a downwardly extending leg member, a light support extending downwardly and forwardly of the base to position a light well below said base, a bracket connected to said light support and having a leg member, and means for rigidly fastening the several leg members to the fork frame, said means including a compression plate straddling the brace leg and lower, intermediate and upper fastening members carried by and secured to the compression plate, the intermediate fastening member contacting with one face of the brace leg and the lower and upper fastening members with the opposing face thereof.

14. In a motorcycle provided with a body portion, a front fork frame pivoted in the longitudinal axis of the body portion having fork and brace members, and a handle bar connected to said fork frame; the combination of a base mounted to turn with the handle bar and having a downwardly extending leg member, a light support extending downwardly and forwardly of the base to position a light well below said base, a bracket connected to said light support and having a leg member, means for rigidly fastening the several leg members to the fork frame, said means including a compression plate straddling the brace leg, lower and upper fastening members contacting with one face of the brace leg and secured to the compression plate, and an intermediate fastening member contacting with the opposing face of the brace leg and secured to the bracket leg member and the compression plate.

15. In a motorcycle provided with handle bars, the combination of an instrument supporting base mounted to turn with the handle bar, a turntable rotatably mounted on said supporting base, a braking pin fixed to the instrument supporting base adjacent its peripheral edge, a brake shoe carried by the pin and positioned adjacent the turntable, a rocker arm threaded to the pin and having a braking cable pinned thereto, and means mounted on the motorcycle handle bar for moving said rocker arm to a braking position.

16. In a motorcycle provided with a handle bar, the combination of an instrument supporting base mounted to turn with the handle bar, a turntable rotatably mounted on said instrument supporting base, an instrument carrying head mounted to swing about the transverse axis, said instrument carrying head being provided with a plate member, a threaded stud adjacent the periphery of said plate member, a brake member screwed on said stud and rotatable thereon to press against the plate member, an arm projecting from the brake member, a hand lever fulcrumed on the handle bar, and an operative connection between said hand lever and arm.

17. In a motorcycle provided with a handle bar, the combination of an instrument supporting base mounted to turn with the handle bar, a turntable rotatably mounted on said instrument supporting base, an instrument carrying head mounted to swing about a transverse axis, said instrument carrying head being provided with a plate member, a braking pin threadedly mounted in a support and contacting with the edge of the plate member, a brake shoe carried by the pin and bearing against the plate member, means for holding the brake shoe against the plate member, a rocker arm fastened to the braking pin and having a cable pinned thereto, and means mounted on the motorcycle handle bar for rotating the rocker arm to frictionally contact the brake shoe against the plate member.

18. In a gun mount, a base member, a support mounted on the base member to swing on an axis perpendicular to the base member, a gun stock fixed to said support, gun holding means mounted on said support to swing on an axis parallel to the base member, and a gun mounted in said means and having a hand grip at its rear end.

19. In a gun mount, a base member, a support mounted on the base member to swing on an axis perpendicular to the base member, a gun stock fixed to said support, gun holding means mounted on said support to swing on an axis parallel to the base member, a gun mounted in said means and having a hand grip at its rear end, and a spotlight carried by said gun holding means and having its optical center parallel to the axis of the gun.

20. In an instrument mount, a normally horizontal base member, a disk mounted on said base member, a vertical pivot carried by said base member and extending through said disk, a bracket fixed to the disk and having a vertical member extending transversely of the disk adjacent its center, a horizontal pivot extending through said vertical member, a plate mounted on the horizontal pivot, an instrument supporting member extending upwardly from the plate to support the rear part of an instrument, and a second instrument supporting member extending upwardly and forwardly from the plate to support the forward part of an instrument.

21. In an instrument mount, a normally horizontal base member, a disk mounted on said base member, a vertical pivot carried by said base member and extending through said disk, a bracket fixed to the disk and having a vertical member extending transversely of the disk adjacent its center, a horizontal pivot extending through said vertical member, a plate mounted on the horizontal pivot, an instrument supporting member extending upwardly from the plate to support the rear part of an instrument, a second instrument supporting member extending upwardly and forwardly from the plate to support the forward part of an instrument, a gun mounted in said instrument supporting members and having a hand grip rearwardly of the first instrument supporting member, and a gun stock fixed to said disk.

22. In an instrument mount, a disk, a bracket carried by said disk and having a vertical member, a horizontal pivot carried by said vertical member, a plate rotatably mounted on said pivot parallel to the vertical member, a second plate having a circular periphery supported from the first plate in spaced relation thereto, said second plate having segments on opposite sides of a diameter arranged at an obtuse angle to each other and flaring from said diameter away from the first plate, and a spring pressed brake member engaging the face of the second plate on the side remote from the first plate and normally at said diameter.

23. In an instrument mount, a disk, a bracket carried by said disk and having a vertical member, a horizontal pivot carried by said vertical member, a plate rotatably mounted on said pivot parallel to the vertical member, a second plate having a circular periphery supported from the first plate in spaced relation thereto, said second plate having segments on opposite sides of a diameter arranged at an obtuse angle to each other and flaring from said diameter away from the first plate, a washer mounted on said pivot in the angle between said segments, a spring mounted on said pivot and bearing on said washer, and means to adjust the tension of said spring.

24. In an instrument mount, a disk, a bracket carried by said disk and having a vertical member, a horizontal pivot carried by said vertical member, a plate rotatably mounted on said pivot parallel to the vertical member, a second plate having a circular periphery supported from the first plate in spaced relation thereto, said second plate having segments on opposite sides of a diameter arranged at an obtuse angle to each other and flaring from said diameter away from the first plate, a casing mounted on said disk opposite said diameter, a plunger projecting through the casing and engaging said second plate, and a spring in said casing urging said plunger against said second plate.

GREENHOW JOHNSTON.